Nov. 12, 1946.   H. VON HORTENAU   2,411,120
TEMPERATURE MEASURING DEVICE
Filed Sept. 6, 1944
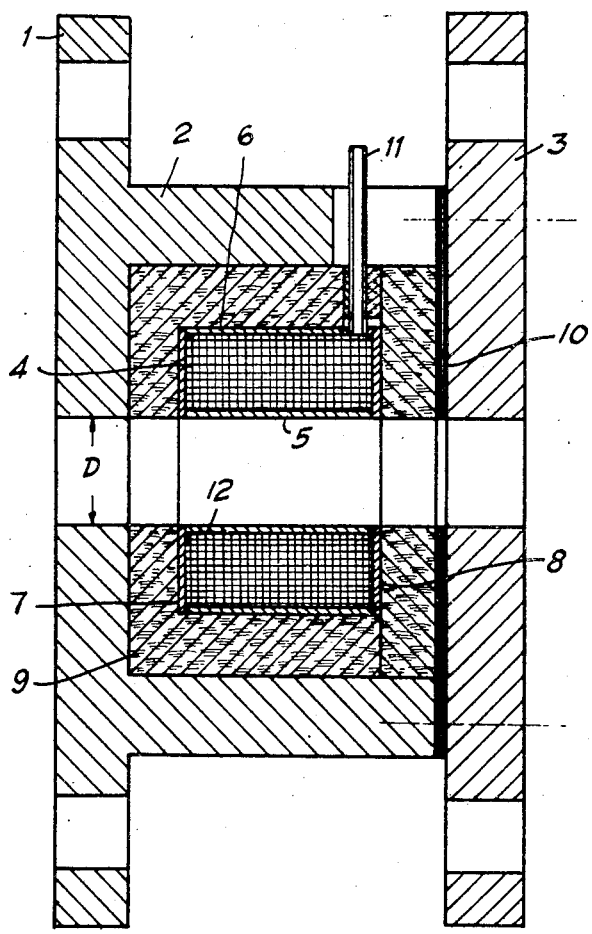

Patented Nov. 12, 1946

2,411,120

UNITED STATES PATENT OFFICE 2,411,120

TEMPERATURE MEASURING DEVICE

Hans von Hortenaü, Stockholm, Sweden, assignor to Stig K. M. Billman, Stockholm, Sweden Application September 6, 1944, Serial No. 552,879
In Sweden October 19, 1943

2 Claims. (Cl. 201—63)

The present invention relates to a temperature measuring device and particularly to means for measuring the temperature of a fluid passing through a conduit, for instance for measuring the temperature of the water in a hot water system in connection with the measuring of the heat quantity consumed in the system, said heat quantity being constituted by the product of the quantity of water flowing therethrough and the drop of the water temperatures in the system. In known measuring devices for measuring the temperature of a fluid passing through a conduit, such as mercury thermometers, liquid thermometers, gas thermometers, steam pressure distance thermometers, thermo-couples or resistance thermometers of known constructions, difficulties are encountered due to the fact that these measuring devices interfere with the flow of the fluid through the conduit and result in hydraulic losses and faulty measurements on account of heat emission through the metallic parts of the thermometers.

The invention has for its object to avoid the above named inconveniences and to provide a temperature measuring device which in spite of simple construction renders possible very accurate measurements of the temperature without interfering with the flow of the fluid and without faulty measurements due to heat emission.

I attain this object by the device illustrated in the accompanying drawing showing a central section of the device.

Between two portions of a conduit, not shown, for the fluid the temperature of which is to be measured, there is inserted a casing which in accordance with the embodiment illustrated consists of a tubular body 2 having a connecting flange 1 for one portion of the conduit. Said body 2 is suitably secured to a plate 3 constituting a connecting flange for the other portion of the conduit. A packing plate 10 is inserted between the parts 2 and 3. The members indicated have the same inner diameters D as the conduit. An annular measuring member 4 is arranged within the casing in a manner such that the inner wall 5 of the member 4 constitutes part of the conduit and has the same inner diameter as the same. Between the casing and the outer wall 6 and the end walls 7, 8 of the measuring member, there is arranged a layer 9 of a suitable heat insulating material, such as cork, Bakelite or the like. The measuring member 4 is connected to a tube 11 having a low heat conductivity and extending through the casing and the insulating layer 9. Through the tube 11, electrical conductors may be connected with the measuring member.

The walls of the measuring member are as thin as possible and consist of a material, such as copper, having a great heat conductivity, in order always to maintain the measuring member at the same temperature as the liquid or gaseous fluid passing through the conduit. Since the measuring member, except the contacting surface with the fluid, is on all sides surrounded by the heat insulating layer, very accurate measuring results will be obtained. Due to the fact that both the casing and the insulating layer as well as the measuring member have the same inner diameters as the conduit proper, hydraulic losses during the passage of the fluid through the measuring means will be entirely avoided.

The measuring member is filled with a material the specific electric resistance of which is responsive to variations of temperature. For instance, the measuring member may be filled with a resistance coil in case of direct current, or, in case of alternating current, with electrolytes of a liquid or semi-liquid (jelly-like) consistency, coal substances or crystalline resistances, a resistance coil 12 being partly and diagrammatically indicated in the drawing.

It will be understood that the invention is not limited to the embodiment shown and described by way of example.

What I claim is:

1. A temperature measuring device adapted to be inserted in a fluid conduit and comprising a casing constituting part of said conduit, an annular measuring member located in said casing and including a material the specific electric resistance of which is responsive to variations of temperature, the diameter of the inner cylindrical face of said measuring member being substantially equal to the inner diameter of said conduit, and heat insulating means disposed between said casing and the outer cylindrical face of said measuring member.

2. In a temperature measuring device, a straight tubular passage for a liquid to be measured, a tubular resistor element forming part of said passage and having a resistance varying with its temperature, the inner cylindrical surface of said element having substantially the same cross-section as the inner surface of the rest of the tubular passage and being located flush therewith, and a thermally insulating layer surrounding the resistor element to prevent heat conduction therefrom in an outward radial direction.

HANS von HORTENAÜ.